2,964,575

CYCLOOLEFIN PRODUCTION USING CYCLOALIPHATIC DIENE CATALYST ACTIVATORS

Antonio A. Sekul, Jackson, Miss., and Henry G. Sellers, Jr., Auburn, Ala., assignors, by mesne assignments, to Cities Service Research and Development Company, New York, N.Y., a corporation of New Jersey No Drawing. Filed Apr. 2, 1959, Ser. No. 803,578

14 Claims. (Cl. 260—666)

This invention relates to the production of cycloolefins and particularly 1,5-cyclooctadiene and substituted 1,5-cyclooctadienes.

The prior art shows the production of cycloolefins from conjugated open chain diolefinic compounds using a catalyst derived from nickel carbonyl by the replacement of one or two of the CO groups thereof with an organic phosphite or phosphine. These processes require an impractical and long period of time for reaction. In one prior disclosure, the process illustratively requires 28 hours in one instance and four days in another. Manifestly this hold-up time is uneconomic and undesirable. Shortening the time for reaction of prior art processes results in an unsatisfactory yield and proportion of conversion of starting materials. Another problem encountered is control of the reaction to yield a relatively high proportion of the desired cycloolefin, and to inhibit side reactions.

In accordance with the present invention a much briefer reaction time is possible and side reactions are inhibited when utilizing particular activators along with the catalyst.

It is an object of this invention to prepare cycloolefinic compounds.

It is a further object of this invention to prepare an activator and catalyst mixture providing rapid catalysis of conjugated diolefinic compounds to cycloolefinic compounds.

Another object of this invention is to provide a process of activating nickel carbonyl catalysts and catalytic derivatives thereof with cycloaliphatic diene activators.

Further objects will be apparent, to those skilled in the art, from a consideration of the following description.

The starting material for this invention is a conjugated open chain diolefin, preferably 1,3-butadiene. Other conjugated open chain diolefins, particularly 1,3-diolefins, and including 2-methyl-1,3-butadiene (isoprene); 2-chloro-1,3-butadiene (chloroprene); 2,3-dichloro-1,3-butadiene; 1,3-pentadiene (piperylene); 2,3-dimethyl-1,3-butadiene; and phenyl diolefins, are useful. Partially substituted halogen derivatives may be used, including mixed halogen derivatives such as chloro-fluoro-1,3-butadienes. Other open chain conjugated diolefins such as 2,4-hexadiene are useful. If desired, peroxides may be removed from the diolefin feed by treatment with ferrous salts, thiosulfates, or sulfites according to available methods.

The catalysts utilizable herein are derivatives of nickel carbonyl bearing, in lieu of one or two of its carbonyl groups, an organophosphine or an organophosphite. These catalysts are of the type disclosed in Reed United States Patent 2,686,208 and 2,686,209. The preferred catalysts for use in this process have a formula $$[(RO)_3P]_xNi(CO)_{4-x}$$

where R is an alkyl aryl, heterocyclic, or other organic radical, and $x$ has a value of one or two, and mixtures thereof. More particularly, it is preferred to use a catalyst having a structure $[(RO)_3P]_2Ni(CO)_2$ where R is phenyl or methyl.

The concentration of catalyst has been conveniently utilized at about 1% of the diolefin charged. However, higher or lower catalyst concentrations are practical; as low as 0.5% catalyst gives excellent results, and about 3% has been used successfully. A range of 0.1–10% by weight is useful.

As is known in the art, it is conventional to use solvents in cycloolefin production from open chain diolefins. Solvents useful in this invention have not been found to be especially critical. Good results are obtained with dicyclopentadiene (dimer of 1,3-cyclopentadiene or 4,7-methyleno-2,5-indanediene), alone or mixed with benzene or other solvents such as 1,5-cyclooctadiene. Tetrahydrofuran, toluene, p-cymene, and benzene, alone or in mixture with 1,5-cyclooctadiene, are useful. Others of those suggested herein can be used as the sole solvent. Petroleum ethers, petroleum naphtha, and other hydrocarbon solvents are useful, as the sole solvent, or in admixture with other solvents.

The mere conjoint utilization of open chain diolefin, catalyst and solvent as used in the prior art does not give rapid results in cycloolefin production, and may result in undesirably high proportions of by-products. It has now been found that specific catalyst activators are essential for rapid results, and that these activators help in selectively controlling the make-up of the end product. The activators of this invention are cycloaliphatic dienes, particularly cycloaliphatic, hydrocarbon dienes, with one or more carbon rings, the unsaturation being on a single ring or in adjoining rings, those preferred being bicycloheptadiene, (bicyclo(2.2.1)-2,5-heptadiene), 1,3-cyclopentadiene, methylcyclopentadiene, 1,3-dicyclopentadiene, methylcyclopentadiene dimer, and 1,5-cyclooctadiene. As implied above, the activator of the invention may serve as the solvent, wholly or in part.

The proportioning of activator to catalyst may vary widely. A range of 13 to 1 to 2 to 1, and even 1 to 2, on a weight basis of activator to catalyst, is convenient. A 6 to 1 proportion has sometimes been found desirable but higher and lower proportions are entirely practicable within the purview of this invention.

It is sometimes desirable but not essential to use a polymerization inhibitor to prevent the open-chain diolefins from polymerizing into products in addition to cycloolefins. Such inhibitors are recognized in the art and encompass mono- or polynuclear mono- or polyphenols, including phenol, catechol, p-tertiary-butylcatechol, resorcinol, 2,4-dimethyl-6-tertiary butylphenol, tertiary amyl phenols, hydroquinones, quinones, 2,5-ditertiary butyl-1,4-benzoquinone, phloroglucinol, pyrogallol, and naphthols; also amines, including N,N'-di-isopropyl-p-phenylenediamine, aniline, p-N-diethylaminoaniline, naphthylamines, triethylamine, and phenothiazine; also aromatic polynitro compounds, picric acid, and terpenes. If present or added, an amount of polymerization inhibitor of from 0.01 to 3% by weight of diolefin starting material ordinarily gives satisfactory control of unwanted by-products. Amounts in the neighborhood of 5% or more may be detrimental to the reaction.

Widely varying pressures have been successfully used; by way of example, dimerization according to this invention may take place at atmospheric pressure by dissolving the diolefin in a liquid mixture of solvent, catalyst, and activator, by bubbling the olefin, if gaseous, into the mixture. On the other hand, pressures as high as 1790 p.s.i. have been utilized.

The time of reaction is a function, inter alia of the temperature but in every case the time is shorter using the activator-catalyst combination with diolefin than is the time required at the same temperature without the activator. For instance, a temperature range of about 90–150° C. has been found to be useful. Both temperature and pressure may vary during the reaction.

Heretofore it was thought that only scrupulously cleaned glass lined reaction vessels were suitable for cycloolefin production. As employed in keeping with the teaching of this invention, glass lined reaction vessels are useful but not essential. Conveniently and with complete success, stainless steel reaction vessels have been found to be practical in this invention as has carbon steel.

If the reagents are not adequately dry, it is beneficial to pretreat with a dehydrating agent, or to incorporate a dehydrating agent in the reaction mixture. Suitable for this is ethylene oxide, calcium oxide, calcium carbide, and calcium sulfate.

The process may be carried out batch-wise, semi-continuously, or continuously.

The products of reaction have utility as chemical intermediates. Thus, cyclooctadiene is useful in the preparation of cyclooctatetraene, cyclooctane, and cyclooctene, as well as in the preparation of polymers. Even the "by-products" such as vinylcyclohexene may be recovered and utilized, for example, to prepare synthetic resins.

It is to be understood that the specific isomers mentioned above or as understood in the art are the ones intended whenever the general name of a group of isomers is used for convenience. Thus, wherever "butadiene" is mentioned, 1,3-butadiene is the isomer referred to, and "cyclopentadiene" is 1,3-cyclopentadiene. Similarly, the cis-cis isomer of 1,5-cyclooctadiene is the geometrical isomer of this invention.

The word "catalyst" is used synonymously with the phrase "reaction initiator" sometimes used in the art, and the phrase "catalyst activators" is used to denote the herein described "activation" compounds even though the exact functions of the compounds have not been completely ascertained.

The following examples are presented for purposes of illustration.

*Example 1.—Cyclopentadiene activator*

In a glass liner for a 740-ml. steel pressure reaction vessel was added:

| | |
|---|---|
| Cyclopentadiene | g-- 5.0 |
| Benzene | ml-- 30 |
| Bis(triphenylphosphite)nickel dicarbonyl | g-- 2.0 |
| p-Tertiary-butylcatechol | g-- 0.1 |
| Calcium carbide, freshly ground | g-- 1.0 |

Cooling of the reaction vessel was commenced with powdered solid carbon dioxide (Dry Ice), and butadiene was bubbled into the mixture in the reaction vessel. The butadiene inhibited the freezing so that it was possible to cool and add butadiene simultaneously with very little loss of volatile materials. By this means, a charge of 70 g. of butadiene was added.

The bomb and contents were heated without agitation. The temperatures used were the approximate minimum and maximum temperatures for the reaction time, as indicated below.

In working up the product, the butadiene was vented from the bomb. The bomb was opened, rinsed with benzene and the entire liquid contents were placed in a distilling flask. The calcium carbide remained behind as a solid. Additional butadiene was removed with the aid of a partial take-off head cooled with Dry Ice, and it was condensed in a trap cooled in Dry Ice. The remaining liquid was stripped from the non-volatile residue, a rubbery polymer in solution, at low pressure which ultimately reached about 5 mm. of mercury while the pot temperature was about 150° C. From the weight of residue was subtracted the total weight of catalyst and activator. This is a rough approximation of the polymer residue.

The volatile products were fractionated to give three principal fractions, benzene boiling at 80° C., vinylcyclohexene boiling at 129–130° C., and 1,5-cyclooctadiene cis-cis boiling at 149–150° C., having a refractive index $n_D^{25}$ 1.4908 and the 2,4-dinitrobenzenesulfenylchloride derivative had a melting point of 115–117° C.

The above general procedure was followed in the remaining examples unless the contrary is indicated.

Reacting at 106–123° C. for 11 hours using cyclopentadiene as the activator produced a cyclooctadiene selectivity of 53.1% with yield of 46.7% and a vinylcyclohexene selectivity of 25.4%.

*Example 2.—Dicyclopentadiene activator*

A mixture of 30 ml. benzene, 2 g. bis(triphenylphosphite) nickel dicarbonyl, 4 g. dicyclopentadiene, 1 g. ground calcium carbide, 0.1 g. p-t-butylcatechol and 75 g. butadiene in a glass liner in a stainless steel bomb was heated without shaking at 90–150° C. for 7.5 hours. The selectivity for cyclooctadiene is 60–74% with 50–60% yield. The selectivity for vinylcyclohexene is 10–15% with 7–12% yield. Changing certain variables as in Examples 3–6 gave the ranges in yields and selectivities.

Repeating this procedure using additional dicyclopentadiene as replacement for the benzene produced similar results, as did replacement of the benzene with toluene as the solvent.

Using a lower reaction temperature in this example, averaging from 90 to 120° C. slightly reduced polymer and vinylcyclohexene formation but slowed the production of cyclooctadiene. Commonly the exothermic reaction in this procedure causes the temperature to rise briefly 20 to 40° C. above the average temperature, with a decrease in pressure occurring during the reaction.

*Example 3.—Dicyclopentadiene activator*

Repeating the process of Example 2, using dicyclopentadiene in an amount of 7.5% of the butadiene charge and reacting for 7 hours at a temperature between 101 and 146° C. produced a 63.2% selectivity for cyclooctadiene and a yield of 54.8%.

*Example 4.—Dicyclopentadiene activator*

Using the conditions of Example 2, with a charge containing 4 g. of dicyclopentadiene and 26 g. of benzene reacted for 5 hours at 89–98° C. effected a cyclooctadiene selectivity of 73.8% and a 53.5% yield.

*Example 5.—Cyclooctadiene activator*

Following the procedure of Example 2, but reacting a charge containing 7.3% of 1,5-cyclooctadiene in place of dicyclopentadiene for 7 hours at a temperature between 101 to 135° C. produced a 50% cyclooctadiene selectivity and a 38.7% yield.

*Example 6.—Dicyclopentadiene activator*

Bubbling 90 g. of butadiene for 3.5 hours through a mixture of 30 ml. toluene, as solvent, 2 g. bis(triphenylphosphite)nickel dicarbonyl, 4 g. dicyclopentadiene, 1 g. calcium carbide and 0.1 g. p-tertiary-butylcatechol at atmospheric pressure and a temperature of 110° C. produced an 88.2% selectivity for cyclooctadiene and 0.42% yield.

*Example 7.—Dicyclopentadiene activator*

Following the steps of Example 6, using p-cymene as solvent and reacting for a total of 4.5 hours at 130° C. produced a 76.2% selectivity for cyclooctadiene with a 2.53% yield thereof.

*Example 8.—Dicyclopentadiene and cyclooctadiene mixed activator*

Reacting a feed mixture of 30 ml. of cyclooctadiene and 4 g. dicyclopentadiene with 2 g. bis(triphenylphosphite)nickel dicarbonyl, 1 g. calcium carbide, 0.1 g. p-tertiary-butylcatechol and 83 g. butadiene in a sealed bomb for 6.5 hours at 99–125° C. produced a 45.3% selectivity for cyclooctadiene and a 25.8% yield.

Example 9.—Dicyclopentadiene activator

Reacting a mixture of 34 g. of dicyclopentadiene with 2 g. bis(triphenyphosphite)nickel dicarbonyl, 1 g. calcium carbide, 0.1 g. p-t-butyl catechol and 93 g. of butadiene in a sealed bomb for 7.5 hours at 95–130° C. produced a selectivity value of 62.3% for cyclooctadiene with a 43.3% yield. The dicyclopentadiene functions as a solvent, and as the activator.

Example 10.—Dicyclopentadiene activator

Reacting a mixture of 30 ml. benzene, 2 g. bis-(triphenylphosphite)nickel dicarbonyl, 4 g. dicyclopentadiene, 1 g. calcium carbide, 0.1 g. p-t-butylcatechol and .75 g. butadiene for 7.5 hours at 90–150° C. in a sealed bomb produced 35–43 g. of cyclooctadiene, a selectivity of 60–74%. Conveniently the progress of the reaction is followed by means of the drop in pressure, which commonly drops from approximately 180 p.s.i. gage to 120 p.s.i.

Example 11.—Dicyclopentadiene activator

Using the manipulative steps of Example 10, with omission of p-t-butylcatechol and heating for 4.5 hours at 90–144° C. gave a 61.3% cyclooctadiene selectivity with a 41.6% yield.

Example 12.—Dicyclopentadiene activator

Into a glass liner of a 710 ml. steel reaction vessel was placed 26 g. of benzene, 0.1 g. of p-t-butylcatechol, 1.0 g. of powdered calcium carbide, 2.0 g. of bis(triphenylphosphite) nickel dicarbonyl, and 5.0 g. of dicyclopentadiene. The glass liner with its contents was weighted and cooled with powdered solid carbon dioxide. As cooling was started, gaseous butadiene was passed into the mixture in the glass liner until the total liquid occupied approximately 40% of the volume of the liner. Then the liner was weighed to determine the weight of the butadiene added, amounting to 67 g. The liner was placed in the steel reaction vessel which was closed and placed in an electric heater with the controller set for 105° C. As the bomb was heated without shaking, an exothermic reaction occurred for a brief period during which the temperature rose to 146° C. Heating without shaking was continued for a total time of 7.3 hours during which time the maximum pressure was 290 p.s.i.g. and the minimum was 104 p.s.i.g.

After cooling, the bomb was vented through a Dry Ice trap to recover unreacted butadiene and the remaining liquid was fractionally distilled. The fractions collected were benzene, vinylcyclohexene and cyclooctadiene. Recovered butadiene was 9 g. Vinylcyclohexene was 10 g. Cyclooctadiene was 36.7 g. with a 55% yield and 63% selectivity.

Example 13.—Dicyclopentadiene activator (stainless steel reactor)

Following the procedure of Example 2, but using an unlined stainless-steel bomb at a temperature from 107 to 115° C. produced cyclooctadiene in a 28% yield and 60% selectivity with a half-reaction time of 1.8 hours as determined from time-pressure data for the pressure to drop half as much as it did in the total time of 7.5 hours.

Example 14.—Dicyclopentadiene activator

The vessel was loaded in the manner described in Example 12, with a reaction mixture of benzene 26 g.; p-t-butylcatechol 0.1 g.; calcium carbide 1.0 g.; dicyclopentadiene 4.0 g.; bis(triphenylphosphite) nickel dicarbonyl 2.0 g.; and butadiene 80 g. The reaction vessel was heated to 85° C. The temperature continued to rise autogenously to 106° C. and then returned to 100° C. and was maintained there for a total of 7.5 hours from the start of heating. Distillation of the reaction products showed a yield of cyclooctadiene of 61% with a selectivity of 73 % and a vinylcyclohexene yield of 9% with a selectivity of 10%.

Example 15.—Dicyclopentadiene activator

In a vertical glass tube fitted with a reflux condenser and a gas-delivery tube, there was placed a reaction mixture of p-cymene 26 g.; p-t-butylcatechol 0.1 g.; bis-(triphenylphosphite) nickel dicarbonyl 2.0 g.; dicyclopentadiene 4.0 g.; and powdered calcium carbide 1.0 g. The reaction vessel was immersed in an oil bath at 130° C. and butadiene was bubbled into the mixture through a delivery tube for 4.5 hours at atmospheric pressure. The total quantity of butadiene used was 74 g. The reaction product in the vessel was then vacuum distilled to give cyclooctadiene 2.24 g., 3.3% yield, 78% selectivity.

Example 16.—Bicycloheptadiene activator

Following the steps of Example 15, but using bicyclo (2.2.1)-2,5-heptadiene in place of dicyclopentadiene, and reacting at 107 to 115° C. for 2.25 hours after reaching reaction temperature produced cyclooctadiene corresponding to a 60% yield and 85.7% selectivity.

Example 17.—Bicycloheptadiene activator

Varying Example 16 by reacting at 90–113° C. for 4.75 hours with shaking produced cyclooctadiene in a yield of 67.2% and 78.5% selectivity.

Example 18.—Methylcyclopentadiene dimer activator

Altering Example 12 by using methylcyclopentadiene dimer in place of dicyclopentadiene and reacting at 103–148° C. for 4 hours gave cyclooctadiene in 51.9% yield and 67.9% selectivity.

Example 19.—Methylcyclopentadiene dimer activator

Using the conditions of Example 18, but reacting at 98–103° C. for 6.5 hours after reaching reaction temperature, produced cyclooctadiene in a 41.2% yield and 60.8% selectivity.

Example 20.—Bicycloheptadiene activator

Repeating Example 12, while using bicycloheptadiene in place of dicyclopentadiene and reacting at 107–117° C. for 2.5 hours effected a yield of 49.8% to cyclooctadiene and a 66.7% selectivity.

Example 21.—Bicycloheptadiene activator

Changing Example 20 by reacting at 100° C. for 7.5 hours total heating time gave a 75.5% yield of butadiene to cyclooctadiene with a selectivity of 83.8%.

Example 22.—Isoprene dimerization

When isoprene is used in place of butadiene in Examples 6 and 14, to obtain dimethylcyclooctadiene similar results are produced.

Example 23.—Chloroprene dimerization

When chloroprene is used in place of butadiene in Examples 6 and 14, for the preparation of dichlorocyclooctadiene, similar results are obtained.

Example 24.—Other catalysts

In the above examples, 1 through 23, when the catalyst or initiator is replaced by bis(triphenylphosphine) nickel dicarbonyl, bis(triphenylantimonite) nickel dicarbonyl, bis(triphenylarsenite) nickel dicarbonyl, bis(triphenylstibine) nickel dicarbonyl and bis(trimethylphosphite) nickel dicarbonyl, similar results are obtained.

The following two examples are in part excluded from the invention, but are given for completeness.

Example 25.—Preparation of bis(triphenylphosphite) nickel dicarbonyl

Triphenyl phosphite, 18.2 g. (0.06 mole), was dissolved in 20 ml. of ether and cooled in ice bath. Ether, 15 ml. in a 50 ml. graduated cylinder was cooled in an ice bath and nickel tetracarbonyl (B.P. 43° C.) was added until the total volume was 18.8 ml. The amount of nickel carbonyl added was then 3.8 ml. (5.0 g., 0.03 mole). The ether solutions of nickel carbonyl and triphenyl phosphite were poured together into a flask and carbon monoxide was evolved slowly. The mixture was maintained for sixteen hours and then stirred under reduced pressure from a water aspirator to evaporate the ether. Upon evaporation of the ether, a white precipitate formed. This precipitate was dissolved in 300 ml. of hot ligroin (25–65° C.) and filtered. On cooling to room temperature, white needles of bis(triphenylphosphite) nickel dicarbonyl $((C_6H_5O)_3P)_2Ni(CO)_2$ separated, were filtered, bottled and stored at 2° C. While this compound is denoted as bis(triphenylphosphite) nickel dicarbonyl, it may in reality be $((C_6H_5O)_3P)_4Ni; No(CO)_4$ of the same empirical formula, or a mixture of compounds.

*Example 26*

Paired runs were made, conditions being identical, except that in one run of the pair this invention was followed by using bicycloheptadiene (BCHD) activator. The reactions were conducted at 125° C. for five hours. The results are as follows:

| Activator | Selectivity, wt. Percent | | |
|---|---|---|---|
| | VCH | COD | ND |
| None | 44 | 25 | 24 |
| 2.5% | 25 | 47 | 25 |

An important product of the reaction where butadiene is utilized has been identified as cyclododecatriene. As a general rule, the yields of this compound are proportional to yields of cyclooctadiene; that is, where a change in a particular reaction variable effects a change in the yield of cyclooctadiene, a similar change ordinarily takes place in the yield of cyclododecatriene. Accordingly, an increase in the yield of cyclooctadiene often is accompanied by an increase in the amount of cyclododecatriene. The ratio of the latter to the former has been as high as 1 to 6. Cyclododecatriene finds utility as an intermediate in the preparation, for example, of cyclododecene and cyclododecane.

As used above:

$$\text{Conversion} = \frac{\text{wt. butadiene consumed}}{\text{wt. butadiene fed}} \times 100$$

$$\text{Selectivity} = \frac{\text{wt. single product}}{\text{wt. butadiene consumed}} \times 100$$

$$\text{Yield} = \frac{\text{conversion} \times \text{selectivity}}{100}$$

$$= \frac{\text{wt. single product}}{\text{wt. butadiene fed}} \times 100$$

VCH is vinylcyclohexene, COD is cyclooctadiene, and ND is non-distillables (at 170°–180° C.).

The invention of this application is related to the copending applications of Sellers and Sekul, Serial No. 801,730, filed March 25, 1959; Burks and Sekul, Serial No. 808,930, filed April 27, 1959; and Bosmajian, Serial No. 816,856, filed May 29, 1959.

We claim:

1. In a process for the production of a cycloolefinic compound containing at least eight carbon atoms in the ring by contacting an open chain conjugated diolefin with a nickel carbonyl catalyst in the presence of a solvent and at a temperature between about 90° and 150° C., the improvement comprising the step of introducing into the reaction zone a cycloaliphatic diene as catalyst activator.

2. In a process for the production of a cycloolefinic compound containing at least eight carbon atoms in the ring by contacting an open chain conjugated diolefin with a nickel carbonyl catalyst bearing in lieu of at least one of its carbonyl groups a compound of trivalent phosphorous in the presence of a solvent and at a temperature between about 90° and 150° C. the improvement comprising the step of introducing into the reaction zone a cycloaliphatic diene as catalyst activator.

3. In a process for the production of a cycloolefinic compound containing at least eight carbon atoms in the ring by contacting an open chain conjugated diolefin with a nickel carbonyl catalyst in the presence of a solvent and at a temperature between about 90° and 150° C., the improvement comprising the step of introducing into the reaction zone a cycloaliphatic hydrocarbon diene as catalyst activator.

4. In a process for the production of 1,5-cyclooctadiene by contacting butadiene with a nickel carbonyl catalyst in the presence of a solvent and at a temperature between about 90° and 150° C., the improvement comprising the step of introducing into the reaction zone a cycloaliphatic diene as catalyst activator.

5. In a process for the production of 1,5-cyclooctadiene by contacting butadiene with a bis(triphenylphosphite) nickel dicarbonyl catalyst in the presence of a solvent and at a temperature between about 90° and 150° C., the improvement comprising the step of introducing into the reaction zone a cycloaliphatic diene as catalyst activator.

6. In a process for the production of 1,5-cyclooctadiene by contacting butadiene with a bis(triphenylphosphite) nickel dicarbonyl catalyst in the presence of a solvent and at a temperature between about 90° and 150° C., the improvement comprising the step of introducing into the reaction zone a catalyst activator selected from the group consisting of bicycloheptadiene, cyclopentadiene, dicyclopentadiene, methylcyclopentadiene, methylcyclopentadiene dimer, and 1,5-cyclooctadiene.

7. In a process for the production of a cycloolefinic compound containing at least eight carbon atoms in the ring by contacting an open chain conjugated diolefin with a nickel carbonyl catalyst in the presence of a solvent and at a temperature between about 90° and 150° C., the improvement comprising the step of introducing into the reaction zone a catalyst activator selected from the group consisting of bicycloheptadiene, cyclopentadiene, dicyclopentadiene, methylcyclopentadiene, methylcyclopendadiene dimer, and 1,5-cyclooctadiene.

8. In a process for the production of 1,5-cyclooctadiene by contacting butadiene with a nickel carbonyl organophosphite catalyst in the presence of a solvent and at a temperature between about 90° and 150° C., the improvement comprising the step of introducing into the reaction zone a catalyst activator comprising bicycloheptadiene.

9. In a process for the production of 1,5-cyclooctadiene by contacting butadiene with a nickel carbonyl organophosphite catalyst in the presence of a solvent and at a temperature between about 90° and 150° C., the improvement comprising the step of introducing into the reatcion zone a catalyst activator comprising cyclopentadiene.

10. In a process for the production of 1,5-cyclooctadiene by contacting butadiene with a nickel carbonyl organophosphite catalyst in the presence of a solvent and at a temperature between about 90° and 150° C., the improvement comprising the step of introducing into the reaction zone a catalyst activator comprising dicyclopentadiene.

11. In a process for the production of 1,5-cyclooctadiene by contacting butadiene with a nickel carbonyl organophosphite catalyst in the presence of a solvent and at a temperature between about 90° and 150° C., the improvement comprising the step of introducing into the reaction zone a catalyst activator comprising methylcyclopentadiene.

12. In a process for the production of 1,5-cyclooctadiene by contacting butadiene with a nickel carbonyl organophosphite catalyst in the presence of a solvent and at a temperature between about 90° and 150° C., the improvement comprising the step of introducing into the reaction zone a catalyst activator comprising methylcyclopentadiene dimer.

13. In a process for the production of 1,5-cyclooctadiene by contacting butadiene with a nickel carbonyl organophosphite catalyst in the presence of a solvent and at a temperature between about 90° and 150° C., the improvement comprising the step of introducing into the reaction zone a catalyst activator comprising 1,5-cyclooctadiene.

14. In a process for the production of 1,5-cyclooctadiene and cyclododecatriene by contacting butadiene with a nickel carbonyl catalyst in the presence of a solvent and at a temperature between about 90° and 150° C., the improvement comprising the step of introducing into the reaction zone a cycloaliphatic diene as catalyst activator.

References Cited in the file of this patent

UNITED STATES PATENTS

| | | |
|---|---|---|
| 2,504,016 | Foster | Apr. 11, 1950 |
| 2,631,173 | Hillyer et al. | Mar. 10, 1953 |
| 2,686,208 | Reed | Aug. 10, 1954 |
| 2,686,209 | Reed | Aug. 10, 1954 |

UNITED STATES PATENT OFFICE
CERTIFICATION OF CORRECTION

Patent No. 2,964,575                          December 13, 1960

Antonio A. Sekul et al.

It is hereby certified that error appears in the above numbered patent requiring correction and that the said Letters Patent should read as corrected below.

In the grant, line 2, for "Henry G. Sellers, Jr., of Auburn, Alabama," read -- Henry G. Sellers, Jr., of Pensacola, Florida, --; in the heading to the printed specification, lines 4 and 5, for "Henry G. Sellers, Jr., Auburn, Ala.," read -- Henry G. Sellers, Jr., Pensacola, Fla., --; column 1, line 70, for "alkyl aryl," read -- alkyl, aryl, --; column 5, line 18, for ".75" read -- 75 --; line 36, for "weighted" read -- weighed --; column 7, line 18, for "$((C_6H_5O)_3P)_4Ni; No(CO)_4$" read -- $((C_6H_5O)_3P)_4Ni; Ni(CO)_4$ --.

Signed and sealed thid 6th day of June 1961.

(SEAL)
Attest:

ERNEST W. SWIDER                          DAVID L. LADD
Attesting Officer                       Commissioner of Patents